April 18, 1967 J. E. KILLPATRICK ETAL 3,314,327
COLORIMETER EMPLOYING TRISTIMULUS VALUES
Filed Dec. 13, 1961 5 Sheets-Sheet 1

INVENTORS.
JOSEPH E. KILLPATRICK
HERMAN G. SPERLING
BY Roger W. Jensen
ATTORNEY.

April 18, 1967   J. E. KILLPATRICK ET AL   3,314,327
COLORIMETER EMPLOYING TRISTIMULUS VALUES
Filed Dec. 13, 1961

INVENTORS.
JOSEPH E. KILLPATRICK
HERMAN G. SPERLING
BY
Roger W. Jensen
ATTORNEY.

April 18, 1967     J. E. KILLPATRICK ET AL     3,314,327
COLORIMETER EMPLOYING TRISTIMULUS VALUES
Filed Dec. 13, 1961     5 Sheets-Sheet 3

INVENTORS.
JOSEPH E. KILLPATRICK
HERMAN G. SPERLING
BY Roger W. Jensen
ATTORNEY.

April 18, 1967   J. E. KILLPATRICK ET AL   3,314,327
COLORIMETER EMPLOYING TRISTIMULUS VALUES
Filed Dec. 13, 1961                                    5 Sheets-Sheet 4
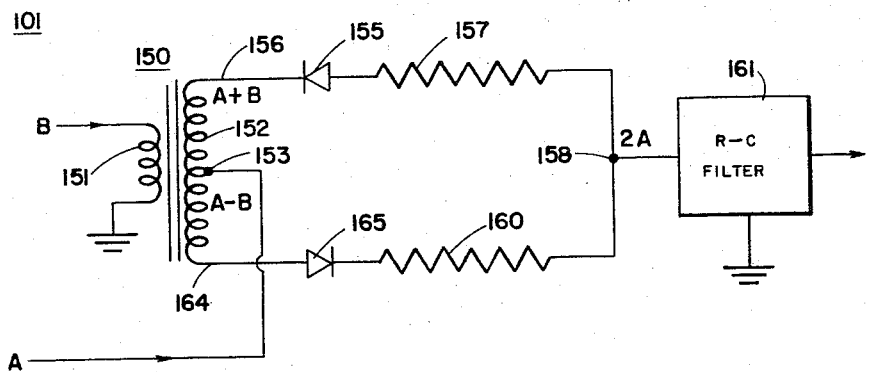
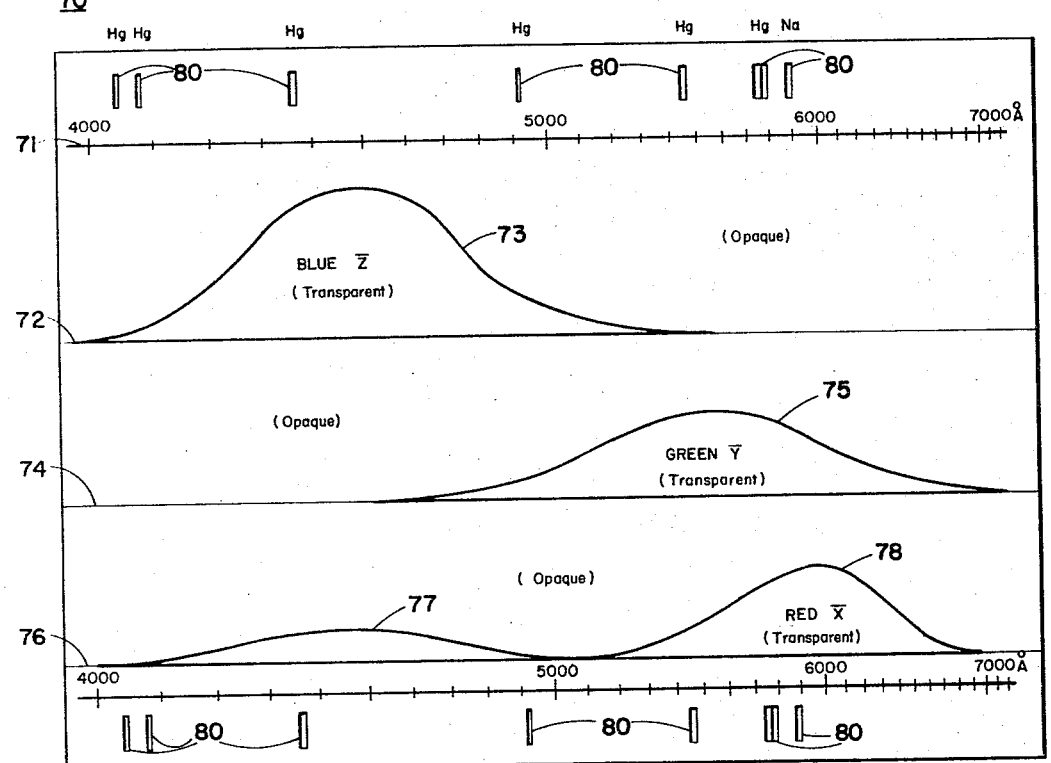
INVENTORS.
JOSEPH E. KILLPATRICK
HERMAN G. SPERLING
BY Roger W. Jensen
ATTORNEY.

INVENTORS.
JOSEPH E. KILLPATRICK
HERMAN G. SPERLING
BY Roger W. Jensen
ATTORNEY.

United States Patent Office 3,314,327
Patented Apr. 18, 1967

3,314,327
COLORIMETER EMPLOYING TRISTIMULUS VALUES
Joseph E. Killpatrick, Minneapolis, and Herman G. Sperling, St. Louis Park, Minn., assignors to Honeywell Inc., a corporation of Delaware
Filed Dec. 13, 1961, Ser. No. 159,016
2 Claims. (Cl. 88—14)

This invention relates to control apparatus and more particularly to a colorimeter capable of producing an electrical output indicative of the color of a substance.

A wide variety of colorimeters have been designed and many methods of defining the quality of light have been devised. However, one of the most effective methods of defining color is by the laws of color mixture which classify all colors in terms of the integrals of spectral radiance and the three color response functions of the eye, called tristimulus values. In prior art colorimeters utilizing this method, glass filters are constructed which absorb all of the wavelengths in white light except the desired spectral energy distribution. These filters are very difficult and expensive to construct and they are subject to many variables. They can never be brought to exactly duplicate the tristimulus values because of the limited number of coloring agents. The prior art devices generally contain three sets of glass filters constructed so that a curve of the amplitude of the light passed by one of the filters versus the wave length of the light passed closely approximates the curve of one of the tristimulus values decided upon by the International Commission on Illumination in 1931.

The curves of the tristimulus values decided upon by the International Commission on Illumination are curves of the amplitude versus wave length of light required by the average observer to match all colors of the spectrum. According to the laws of color mixture, any spectral or desaturated color may be specified in terms of these curves. The color mixture functions (or distribution functions) are generally denoted by the symbols $\overline{X}$, $\overline{Y}$ and $\overline{Z}$. They are broad band spectral distribution functions having peaks in the red, green and blue regions of the spectrum (for the tristimulus values but may take on a different form if other arbitrarily chosen values are utilized), and refer to an equal radiance spectrum. All colors may be thought of as being composed of varying amounts of these three basic distribution functions and to evaluate the quality of a color three quantities known as chromaticity coordinates are defined. The three chromaticity coordinates are $x$, $y$ and $z$. The chromaticity coordinate $x$ may be determined by dividing the tristimulus value X by the sum of the three tristimulus values, where X is defined by the formula $$X = \int_0^\infty E_\lambda \overline{X}_\lambda d\lambda$$

where $E_\lambda$ is the radiance distribution reflected or transmitted from some sample. The chromaticity coordinate $y$ may be determined by dividing tristimulus value Y by the sum of the three tristimulus values. The chromaticity coordinate $z$ may be determined by dividing the tristimulus value Z by the sum of the three tristimulus values. Both Y and Z are defined by an integral similar to that defining X except in terms of $\overline{Y}$ and $\overline{Z}$ respectively. However $z$ is not an independent value since the sum of $x$, $y$ and $z$ is equal to 1. Thus, by finding the three tristimulus values for any unknown color, the three chromaticity coordinates can be determined and the unknown color can be plotted as a point on a chromaticity diagram. A chromaticity diagram is simply a way of specifying color and, while it is not necessary to convert tristimulus values to chromaticity coordinates when simply comparing two different colors, the chromaticity coordinates and the chromaticity diagram are convenient methods of defining a color for future use or for standardized mathematical specification without the necessity for material samples. Luminance or brightness is basically defined as the scalar sum of the reweighted tristimulus value, and in the CIE system it is proportional to Y. Therefore, the present device also gives a measure of the brightness of the light from the unknown sample.

In the prior art devices a sample of the unknown color is first obtained by some means such as reflecting white light from a sample of material having the unknown color. The sample of material will absorb all energy in the white light except in those wavebands which characterize its color. The beam of light having the unknown color is then passed through a first set of glass filters which transmits one of the distribution functions ($\overline{X}$, $\overline{Y}$ or $\overline{Z}$). The amplitude of the light passing through the device is measured by some convenient method and in this manner the amplitude of the tristimulus value X is obtained. The first filter set is then removed and a second set of glass filters is then placed in the beam of light and the amplitude of the Y tristimulus value is obtained. The second filter is then removed and a third set of glass filters is placed in the beam of light giving the amplitude of the tristimulus value Z as previously described. Once the amplitudes of the three tristimulus values are obtained the chromaticity coordinates may be calculated mathematically. The color of the unknown sample is then defined and may be compared to other colors at future times.

Thus, it can be seen that the prior art devices were dependent in accuracy on the degree to which the filters approximated the $\overline{X}$, $\overline{Y}$, $\overline{Z}$ functions. Also, a single sample is utilized from which three readings must be obtained, after which the chromaticity coordinates are calculated. This means that much time is used in obtaining the readings and if a large quantity of material is to be checked for color continuity, a sketchy average can be obtained at best. Also, any variation in electronic components or optical components between readings may cause a great variation in the chromaticity coordinates obtained.

In the present invention a beam of light, which may come directly from the material having the unknown color by means of reflectance or transmission or which may be combined with a beam of light having a known color in several ways, as will be explained later, is chopped at three substantially different frequencies, each of which are chosen so that no major multiples or harmonics thereof are equal. The beam is then passed through some spectrum forming means such as prisms or diffraction gratings. It should be noted that the light may be chopped after it is formed into a spectrum and the same result will occur. The chopping is accomplished so that in effect three spectra, each having a characteristic frequency, are established. These spectra will be stacked adjacent to each other and, except for the different frequencies, will appear as one spectrum. However, to reduce stray light and interaction between the three spectra the chopping means is constructed so that only one spectrum is being transmitted at a time. It should be noted that by allowing light to pass through only one opening in the chopping means at a time three different frequencies would not actually have to be used. In the present invention, however, three different frequencies are explained because it insures separation in the computer.

The spectra are then passed through a mask filter or template which is formed to give the distribution functions which in this embodiment are tristimulus values. Since each of the tristimulus values is made up of a characteristic portion of a spectrum, for example the $\overline{Z}$ function is substantially varying amounts of the blue portion of a spectrum, if a mask filter is mounted to intersect the spectrum and the mask filter is constructed so that it is opaque at all portions of the spectrum except the blue portion which is the $\overline{Z}$ function, the portion of light passing through the mask filter will actually be the Z tristimulus value. Also, mask filters can be constructed for the $\overline{Y}$ and $\overline{X}$ functions in the same manner and the Y and X tristimulus values can be obtained. In the present invention three mask filters for the three tristimulus values are stacked adjacent to each other so that they each intercept only the portion of the spectra which is chopped at the frequency characteristic to that particular tristimulus function. Thus, the three adjacent spectra having characteristic frequencies are passed through mask filters and three beams of light having characteristic frequencies and amplitudes corresponding to X, Y and Z tristimulus values are obtained. In the present device these three values, or beams of light, are applied to a single detector. It should be noted that while this explanation has been given in terms of the tristimulus values these primaries were picked arbitrarily and other values would operate also. Thus, it is not intended to limit this invention to the tristimulus value but rather, to include any arbitrary values that may be picked.

A single light detector is utilized so that any variations, whether electrical or optical, will affect all three beams of light, or tristimulus values, in the same manner and, thus, the output will still be representative of the color of which it is desired to find the quality. The electrical output from the light detector is applied to an electrical filtering system which separates the three frequencies and provides three electrical outputs representative of combinations of the three tristimulus values. These three electrical signals representing combinations of the three tristimulus values are then applied to a computer which computes the chromaticity coordinates of the color of the material and produces electrical signals which may control the color of the material which the colorimeter is looking at, for example, by varying the amount of dye in a cloth or liquid, or they may be used to excite some type of indicating means.

Thus, a highly accurate, completely automatic colorimeter is disclosed which is easily and cheaply constructed.

Accordingly it is an object of this invention to provide the sensing and computing means for an improved control apparatus.

Another object of this invention is to provide an improved and highly accurate colorimeter.

Another object of this invention is to provide a colorimeter capable of complete automation.

These and other objects of the present invention will be understood upon consideration of the accompanying specification, claims, and drawings, of which:

FIGURE 5 is a drawing of the mask filter utilized in the present invention;

FIGURE 7 is a schematic diagram of one of the filters.

Figure 1:
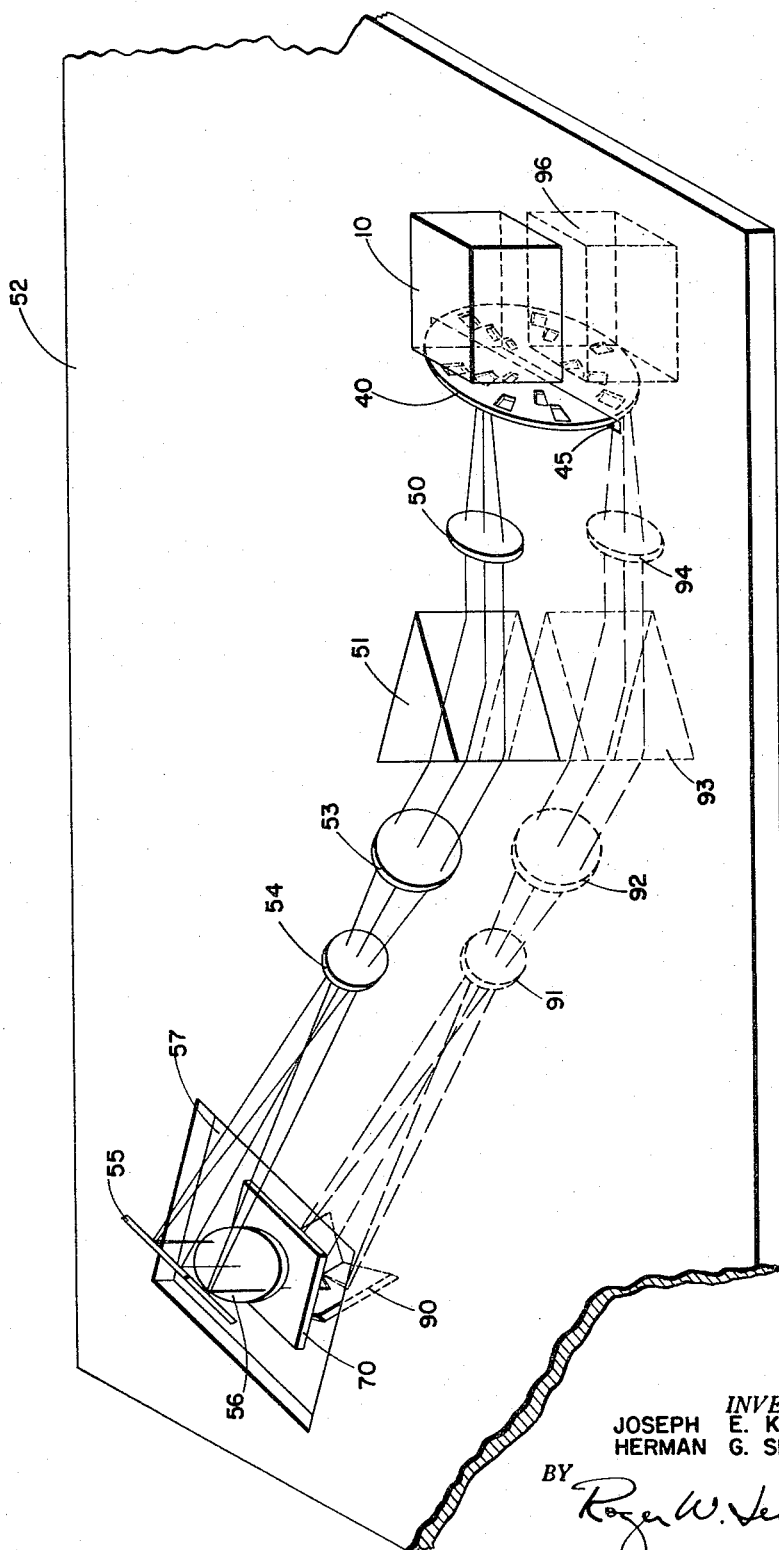
FIGURE 1 is a pictorial view of the present invention in somewhat schematic form.

In FIGURE 1 a source of light designated 10 is mounted on the upper side of a mounting means 52, which may be any opaque material, and reflects a light of which it is desired to determine the quality. This source of light 10 may emit light by reflectance or transmission from a known colored sample and an unknown colored sample of material, by reflectance or transmission from any sample, having an unknown color by itself, or by various other means. A method whereby the emitted light may be obtained from a sample having an unknown color and a sample having a known color is shown more clearly in FIGURES 2 and 3.

Figure 2:
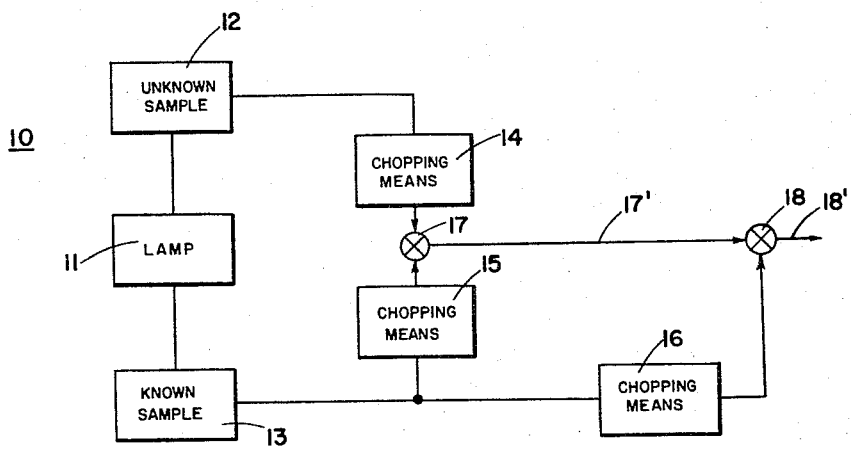
FIGURE 2 is a block diagram of the optical apparatus for producing a single beam of light which is a comparison of two separate sources.

In FIGURE 2 a lamp 11 produces light which is transmitted to a sample of material 12 having an unknown color and a sample of material 13 having a known color. In this case the sample 13 could be a piece of cloth and the sample 12 could be a second piece of cloth to which it is desired to match the first piece 13. The sample 12 and the sample 13 receive the light from lamp 11 and reflect or transmit light to suitable chopping or interrupting means 14 and 15 respectively. Chopping means 14 chops or interrupts the light from sample or source 12 at the same frequency, but 180° out of phase, as chopping means 15 chops or interrupts the light from sample or source 13. The light passing through chopping means 14 and 15 is combined in a combining device or summing means 17. When the two chopped samples of light are combined in combining means 17 the light which is emitted is a flicker presentation of both samples or sources 12 and 13. That is, first the light from one sample or source will appear and then the light from the other sample or source will appear alternately. Thus, in effect the light from sample 12 is compared to the light from sample 13 and the light emitting from the combining means 17 is the distinction or difference between the light from the two samples. The flicker presentation from combining means 17, shown in FIGURE 2 as beam 17', is transmitted to a second combining means 18. The light from sample 13 is also chopped at a different frequency by another chopping means 16 and is combined with beam 17' in the second combining means 18 to form a beam 18'. The beam 18' is the light already explained as emitting from light source 10 in FIGURE 1.

Figure 3:
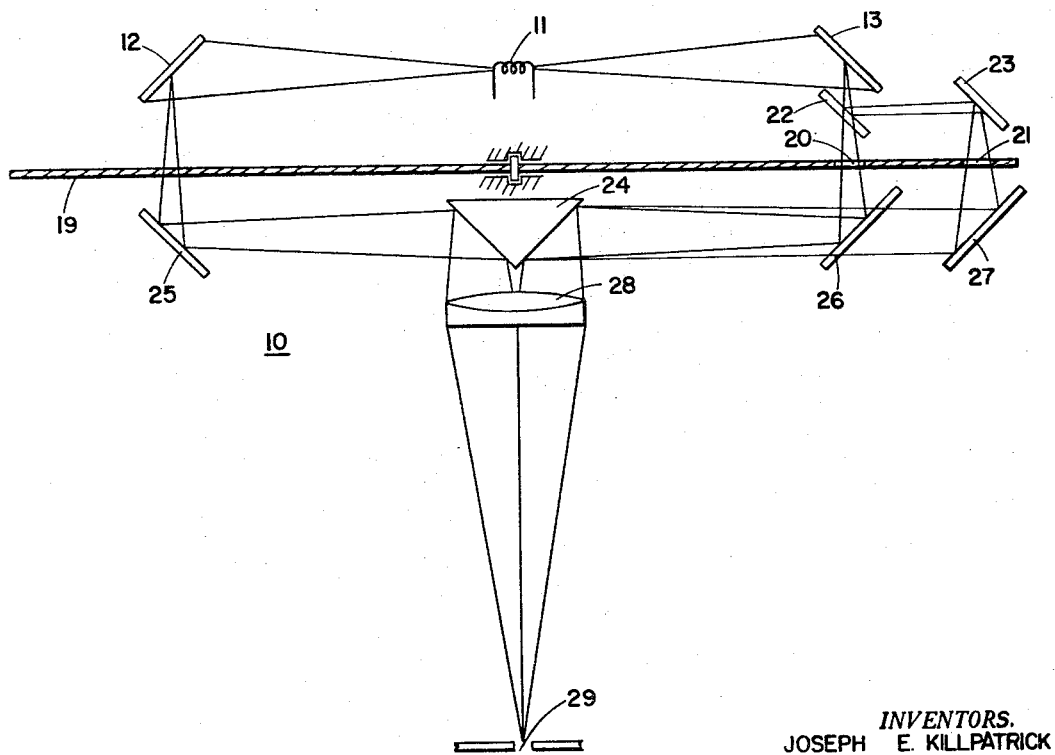
FIGURE 3 is a schematic drawing of the optics shown in block diagram form in FIGURE 2.

In FIGURE 3 a device such as that shown in block form in FIGURE 2 is depicted. In FIGURE 3 the lamp 11 transmits light to the sample 12 having the unknown color and also to the sample 13 having the known color. In the present case samples 12 and 13 are sample holders for diffuse surface colors, but it should be noted that by simply making 12 and 13 mirrors and placing known and unknown transparent color samples in the light path they could be made to transmit the light. A chopping disc 19 is shown in FIGURE 3. It is supported by suitable means for rotation about an axis lying in the plane of the paper of FIGURE 3 and includes all three chopping means 14, 15 and 16 shown in FIGURE 2. This is accomplished by having a set of apertures 20 evenly spaced in a circle having a first radius. These apertures 20 are so spaced that when the light reflected from sample 13 passes through an aperture the light from sample 12 is blocked and alternately when the light from sample 12 passes through an aperture the light from sample 13 is blocked.

To transmit the light from sample 13 to the portion of chopping wheel 19 which acts as chopping means 16 of FIGURE 2, a first half silvered mirror 22 is positioned between sample 13 and the apertures 20 and reflects approximately half of the light in a direction perpendicular to the other half of the light which passes from sample 13 through apertures 20. The portion of the light reflecting from sample 13 which is reflected perpendicularly outward by the half silvered mirror 22 is again reflected downward toward the chopping wheel 19 by a mirror 23. This portion of the light is chopped by a second set of apertures 21 evenly spaced in a circle having a second radius. The set of apertures 21 will have a different number of apertures than the set 20 so that a different chopping frequency will be obtained.

After the light from sample 12 is chopped by apertures 20 it is reflected toward a centrally located combining prism 24 by means of a mirror 25. Combining prism 24 takes the place of both adders 17 and 18 in FIGURE 2. A half silvered mirror 26 reflects the chopped light from sample 13 which passes through apertures 20 toward the adder or combining prism 24. Also, the light from sample 13 which is passed by the apertures 21 is reflected by a mirror 27 through the half silvered mirror 26 to the combining prism 24. All three of the chopped light beams are added in the combining prism 24 and transmitted to a set of lenses 28. The set of lenses 28 focuses the combined beams of light onto a slit 29 in the container within which apparatus 10 is housed. Thus, a beam of light is emitted from the housing of apparatus 10 which is a combination of light reflected from a sample 13 having a known color and chopped at a first frequency, and light which is coming alternately from the sample 13 having the known color and the sample 12 having the unknown color and chopped at a second frequency.

The light emitting from slit 29 in light source 10 is passed through a chopping wheel 40 which chops the light at three different frequencies simultaneously. In effect the chopping wheel 40 separates the light emanating from the slit 29 into three beams all of which are varying at a substantially different frequency. This can be seen more clearly by referring to FIGURE 4.

Chopping wheel 40 has a centrally located hole 41 which may be utilized to rotatably mount the chopping wheel in a slot 45 in the mounting means 52 and about which the chopping wheel may be rotated at a constant speed by some convenient means, not shown. A set of apertures designated 42 is composed of ten openings equally spaced about a circle which has a first radius and is concentric with the central hole 41. A second set of apertures designated 43 is comprised of six openings equally spaced about a circle which has a second radius and is concentric with hole 41. A third set of apertures 44 is comprised of four openings equally spaced about a circle with a third radius and is concentric with hole 41. The three sets of apertures may have any number of openings and the number used here is only for explanatory purposes. When the number of openings in all three sets are the same the chopping is done at the same frequency. In this case it is necessary to use a gating system in the computer (to be explained later) which will allow electrical signals to pass through only one channel at a time. However, the apparatus described uses three different frequencies since this is the preferred embodiment.

Figure 4:
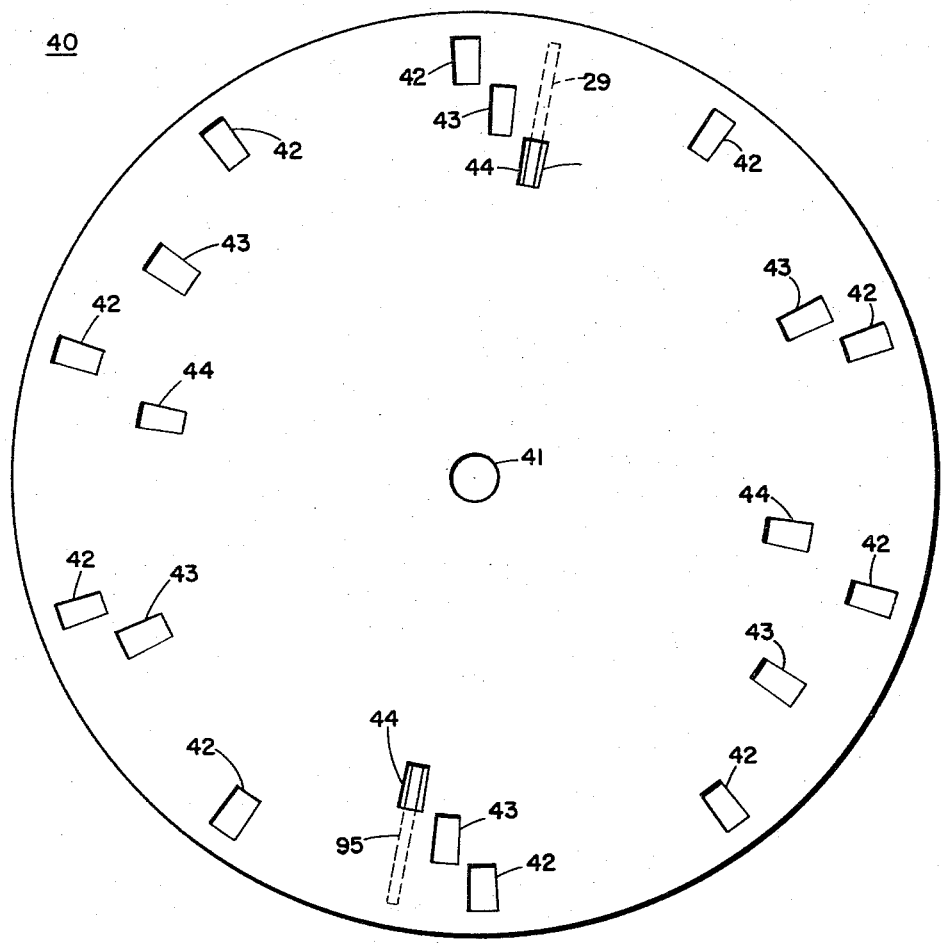
FIGURE 4 is a figure of a three frequency chopping reticle.

The relative position of slit 29 in light source 10 is shown in FIGURE 4. It can be seen that each of the sets of apertures 42, 43 and 44 chop a different portion of the light emanated from slit 29. Also, since each set of apertures contains a different number of openings the portion of the light emanating from slit 29 which they chop will be chopped at a different frequency. The frequency at which each of the portions of light are chopped will depend upon the speed with which wheel 40 is rotating and the number of openings in the set of apertures. It should be noted that the sets of apertures are positioned on chopping wheel 40 so that at no time does light pass through more than one opening and also the openings are positioned so that each one has another opening in the same set of apertures exactly 180° away from it on wheel 40. As will be explained more fully later this positioning of the openings is important for reducing stray light.

After the light emanating from light source 10 is chopped at three different frequencies by chopping means 40 it is collimated by a lens 50 and transmitted to a spectrum forming means such as a prism 51. Prism 51 is mounted on the upper side of mounting means 52 in optical alignment with collimating lens 50 and forms, in effect, three spectra from the light transmitted to it. To explain, light source 10 is mounted on mounting means 52 so that slit 29 is perpendicular to the surface of mounting means 52. The light emanating from slit 29 then passes through chopping wheel 40 where it is chopped at three different frequencies. The portion of the beam closest to mounting means 52 is chopped at a first frequency, the next one-third of the beam above that is chopped at a second frequency and the upper one-third of the beam, or the portion farthest from mounting means 52 is chopped at a third frequency. This beam of light, chopped at three different frequencies, is then passed through prism 51 which forms the beam into a spectrum. The portion of the beam closest to mounting means 52 which is chopped at the first frequency forms a complete spectrum varying at the same frequency, the portion of the light beam chopped at the second frequency forms a second complete spectrum varying at the second frequency and the third or uppermost portion of the beam chopped at the third frequency forms a third complete spectrum. In other words the spectrum formed by 51 is divided vertically into three spectra which are flashing at different frequencies and no two of which are on simultaneously.

The spectrum formed by prism 51 is passed through a pair of focusing lenses 53 and 54 and reflected off a mirror 55 down through an opening 57 in the mounting means 52 and into a field lens 56. The focusing lenses 53 and 54 are positioned so that they focus the spectrum on a point ahead of mirror 55. Thus, the spectrum is actually turned around or reversed when it is reflected by mirror 55 and, as will be explained more fully later, this causes a great reduction in stray light. A mask filter 70 is mounted within aperture 57 in mounting means 52 by means not shown. Mask filter 70 is mounted in optical alignment with field lens 56, which images the exit aperture of the optical system formed by lenses 53 and 54 onto the entrance aperture of the optical system formed by lenses 91 and 92, and, thus, receives the spectrum which is chopped at three different frequencies. The operation of mask filter 70 can be seen more clearly in conjunction with FIGURE 5.

In FIGURE 5 a preferred embodiment of mask filter 70 is shown but it should be noted that many other embodiments could be constructed by one skilled in the art and would not deviate from the basic scope of this invention. For convenience in explanation it will be assumed that the light passing through the openings in the set of apertures 42 in chopping disc 40, which is also the uppermost spectrum formed by prism 51, impinges upon the portion of mask filter 70 between a pair of lines marked 71 and 72 which are parallel to each other and to the upper edge of filter 70. The line 71 is graduated in Angstroms (A.) from approximately 4000 to approximately 7000 and is nonlinear because it represents the visibile spectrum as it is dispersed by a glass prism. A curve 73 is a nonlinear expansion of the $\overline{Z}$ color mixture function and it is placed in the proper position in relation to the visible spectrum, which is about 4500 A. The tristimulus values, as has been explained earlier in this specification, are the values of the three basic colors, generally red, green and blue, which may be used to define all other colors and they are found by integrating the color mixture functions as explained earlier. All of the area of mask filter 70 between lines 71 and 72 is opaque except the area under curve 73 which is transparent. Thus, only the portion of the spectrum emanating from prism 51 impinged upon mask filter 70 between lines 71 and 72 which falls upon the area underlying curve 73 and above line 72 will pass through the filter. The amount of light which passes through the transparent portion between lines 71 and 72 will be the value of the Z tristimulus value in the light emitting from light source 10 and will be chopped at the characteristic frequency given it by chopping means 40.

The spectrum impinging upon the portion of mask filter 70 between line 72 and a line 74 which is parallel to line 72 but a substantial distance below it, will be the spectrum formed from the light emitting from light source 10 which is chopped by the set of apertures 43. A curve 75 which is a nonlinear expansion of the color mixture function $\overline{Y}$, is shown in its proper position in relation to the wave length of a visible spectrum, which is approximately 5500 A. All of the area of mask filter 70 between lines 72 and 74 is opaque except the area under curve 75 which is transparent. Thus, the portion of the spectrum emanating from prism 51 which is impinged upon mask filter 70 between lines 72 and 74, that passes through the transparent portion under curve 75 will be the Y tristimulus value of the light emitting from light source 10 and will have the characteristic frequency given to it by the set of apertures 43 in chopping means 40.

The area of the mask filter 70 between line 74 and a line 76 drawn parallel to and a substantial distance below line 74 is the area upon which the spectrum formed by prism 51 from the light emitted by the set of apertures 44 is impinged. All of the area between the lines 74 and 76 is opaque except the area under the curve for the $\overline{X}$ color mixture function, a twin peak curve having a first peak 77 at approximately 4500 A. and a second peak 78 at approximately 6000 A., which is transparent. Thus, the amount of the spectrum impinged upon the area between lines 74 and 76 of mask filter 70 which passes through the transparent portions under curves 77 and 78 is equal to the X tristimulus value of that spectrum and has a characteristic frequency given to it by the set of apertures 44 in chopping wheel 40.

The slits on the upper and lower edge of the mask filter 70 which are marked with the numerals 80 are the positions in the visible spectrum where the characteristic spectral lines from a mercury arc lamp and a sodium arc lamp would appear. By passing the light from either of these arc lamps through the present device and aligning the mask filter 70 for the maximum amount of light emitting from slits 80 the filter would be accurately aligned with the optical portions of the apparatus to permit the correct evaluation of the X, Y and Z values of light source 10.

After the spectrum formed by prism 51 is filtered by mask filter 70 the light is reflected by a mirror 90 back along the underside of mounting means 52. In this preferred embodiment the optical components on the underside of mounting means 52, and the light paths, are similar to the components on the upper side of mounting means 52. That is, the light from mirror 90 enters a set of focusing lenses 91 and 92. Because the light is entering lenses 91 and 92 from a focal point, they now act as collimating lenses and collimate the light which is transmitted to another prism 93. The prism 93 operates in a reverse manner to prism 51 and reforms a beam of light from the spectrum which has been transmitted to it. This collimated beam of light is then focused by means of a lens 94 upon a slit 95 (see FIGURE 4) is a detecting means 96. Slit 95 is positioned approximately 180° away from slit 29 behind chopping means 40.

Thus, at a particular instant of time one of the openings of the set of apertures 44 will be optically aligned with slit 29, as shown in FIGURE 4, and a beam of light will be transmitted. This beam of light will be formed into a spectrum by prism 51 and will impinge upon the area of mask filter 70 between lines 74 and 76 where only the $\overline{X}$ value will allowed to pass and be transmitted back to prism 93. Prism 93 will reform this $\overline{X}$ value of light into a beam of light which will be focused upon another opening of the set of apertures 44 which is at that moment in front of slit 95 and this beam of light will be allowed to pass to detector means 96. An instant later a portion of light from source 10 passes through an opening in the set of apertures 42 and is formed into a spectrum by prism 51. The Z portion of this spectrum is allowed to pass, by the area of mask filter 70 between lines 71 and 72, and this portion of the spectrum is reformed into a beam of light by prism 93. This beam of light is focused on an opening in the set of apertures 42 which is directly opposite the previous mentioned opening on wheel 40 and in front of slit 95. Thus, the Z value of the light emitted from light source 10 is transmitted to detector means 96. An instant later one of the openings in the set of apertures 43 is in front of slit 29 and a portion of the light emitted from light source 10 is allowed to pass to prism 51 which forms it into a spectrum. This spectrum imgines upon the area of mask filter 70 between lines 72 and 74 and the Y portion of the spectrum is allowed to pass to prism 93 where it is reformed into a beam of light which passes through another opening of the set of apertures 43 that is in front of slit 95 in detector means 96.

Because lens systems 53, 54 and 91, 92 channel the light very closely, if any light entering the system from light source 10 is chopped at a single frequency but passes through more than one of the apertures cut in mask filter 70 the unwanted portion of light which passes through the filter 70 will be focused on a blank portion of chopping means 40 and will not pass through light detecting means 96. That is, when the chopping wheel 40 is in the position shown in FIGURE 4 only the light leaving aperture 29 through the opening in the set of apertures 44 that passes through the filter between the lines 74 and 76 will be focused on the opening in the set of apertures 44 in front of slit 95 and, then, reach detector 96. Thus, a means of obtaining the three tristimulus functions X, Y and Z simultaneously is shown and means have been incorporated in the apparatus to effectively cancel out all stray light. Further, each of the color values is coded at a particular chopping frequency.

Figure 6:
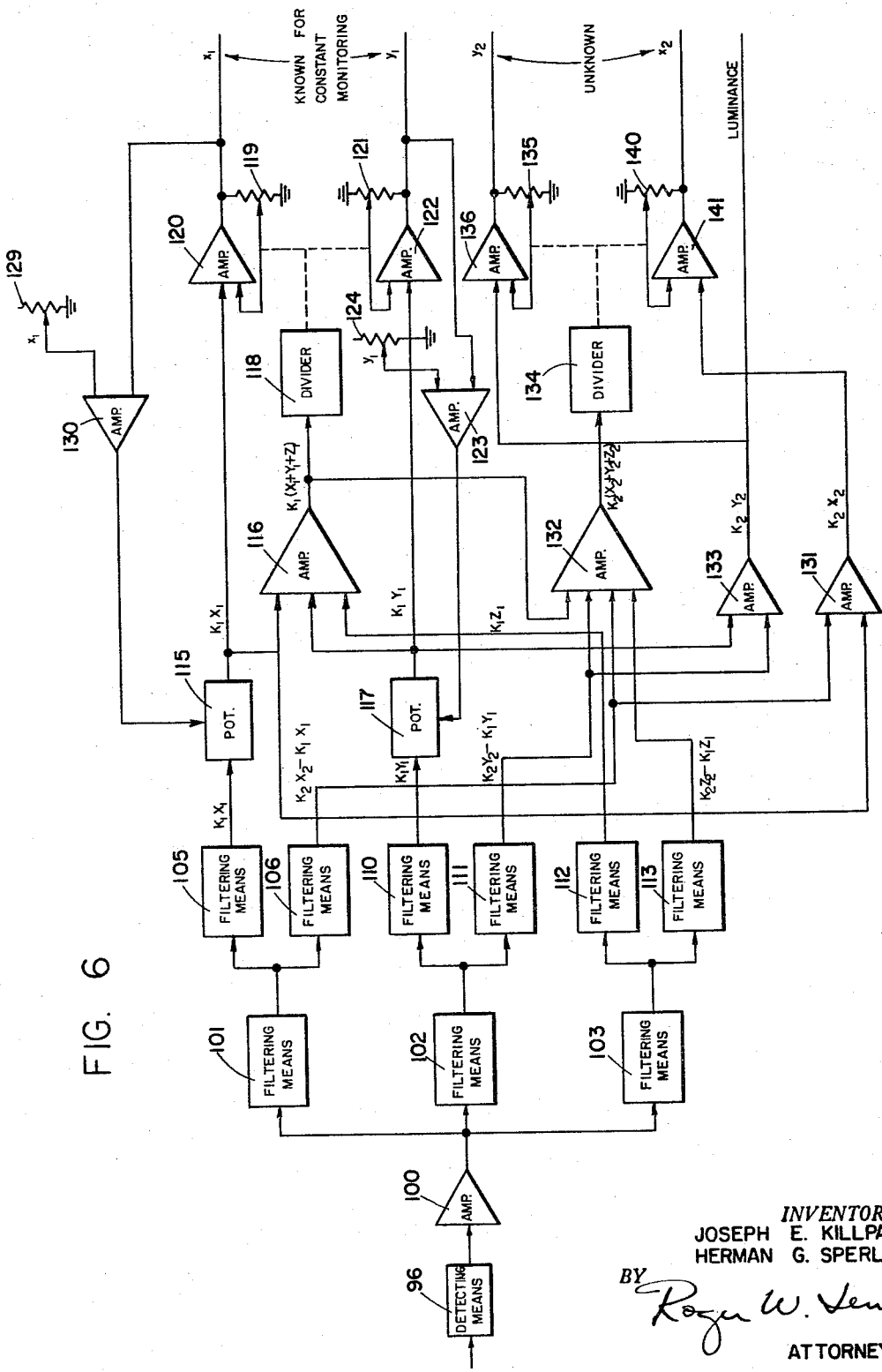
FIGURE 6 is a block diagram of the filtering means and computer means.

In FIGURE 6 detecting means 96 is shown connected to computing means that will give an electrical output equal to the chromaticity coordinates of the color of light emitting from light source 10. As has previously been explained and shown the light emitting from light source 10 is comprised of a portion of light having an unknown color emitting from a sample 12 and a portion of light having a known color emitting from sample 13. The light from both of these samples is chopped at the same frequency by chopping means 14 and chopping means 15 and combined in a combining device 17. Since this is a flicker presentation of each of the light samples, the beam of light emanating from combining means 17 will actually be the difference or distinction in color between the two. Also, a portion of the light from the sample having the known color is chopped at a second frequency, and added to the flicker presentation in combining means 18 to form the beam of light emanating from light source 10. The light beam emanating from light source 10 is then chopped at three different frequencies simultaneously and filtered by mask filter 70 so that the beam of light focused on detecting means 96 contains the three tristimulus functions of the composite light beam, which originally emanated from light source 10, each having a characteristic frequency. For simplicity in explanation the computer means shown in FIGURE 6 is shown in block form and the electrical input and outputs of each of the blocks will be assumed to follow a single line.

The electrical signal from detecting means 96 is amplified in an amplifier 100 and applied to three filtering means 101, 102, and 103. Filtering means 101 is tuned to pass only the frequency at which the set of apertures 44 on chopping wheel 40 chop the light beam from light source 10. Filtering means 102 is tuned to pass only the frequency at which the set of apertures 43 on chopping wheel 40 chop the beam of light from light source 10. Filtering means 103 is tuned to pass only the frequency at which the set of apertures 42 on chopping wheel 40 chop the beam of light from light source 10. Thus, the filtering means 101, 102 and 103 separate the three tristimulus functions X, Y and Z in the light emanating from light source 10. In the event that light source 10 was simply a single source of light of which it was desired to determine the three tristimulus functions, filtering means 101, 102 and 103 would effectively do this. However, in this preferred embodiment it is desired to compare the sample of material having the unknown color with a sample of material having a known color and for this operation the further apparatus has been included.

The output of filtering means 101 is applied to two further filtering means 105 and 106. Filtering means 105 is tuned to pass the X value of the known color from sample 13 which has a frequency given to it by chopping means 16. Filtering means 106 is tuned to pass the signal which represents the distinction or difference between the X values of the known color and the unknown color which have the frequency given to them by chopping means 14 and 15. For convenience the functions from the known color of light will have a subletter 1 and the functions from the unknown sample of light will have the subletter 2. Thus, the electrical signal output from filtering means 105 is equal to some amplitude $K_1X_1$ and the electrical signal output from filtering means 106 is equal to $K_2X_2-K_1X_1$.

The electrical output from filtering means 102 is applied to a pair of filtering means 110 and 111. Filtering means 110 is tuned to pass only the Y value of the light having the known color, which is chopped by chopping means 16. The electrical output of filtering means 110 is equal to $K_1Y_1$. Filtering means 111 is tuned to pass only the frequencies at which chopping means 14 and 15 chop the light having the known and unknown colors. The electrical output of filtering means 111 is equal to $K_2Y_2-K_1Y_1$.

The electrical output from filtering means 103 is applied to a pair of filtering means 112 and 113. Filtering means 112 is tuned to pass only the frequency at which chopping means 16 chops the light having the known color. The electrical output from filtering means 112 is equal to $K_1Z_1$. Filtering means 113 is tuned to pass only the frequencies at which chopping means 14 and 15 chop the light from the unknown sample 12 and from the known sample 13. The electrical output of filtering means 113 is equal to $K_2Z_2-K_1Z_1$.

In FIGURE 7 a preferred embodiment of a filtering means is shown which may be used in the block diagram in FIGURE 6 as filtering means 101, 102, 103, 105, 106, 110, 111, 112, and 113. In FIGURE 7 filtering means 101 has a transformer 150 with a primary 151 which has one side grounded. The other side of primary winding 151 has the signal applied thereto which it is desired to have the filtering means pass, in this case the signal from amplifier 100 (see FIGURE 6). Transformer 150 also has a secondary winding 152 with a center tap 153. The secondary winding 152 has an A.C. reference signal which has the same frequency as the signal it is desired to pass, applied to the center tap 153. One end of the secondary winding 152 is connected to a diode 155 by means of a lead 156. The other end of diode 155 is connected to a resistor 157. The other end of resistor 157 is connected to a junction point 158 which also has connected to it one end of a resistor 160. Also connected to junction point 158 is an RC filter 161. The other end of secondary winding 152 is connected to a diode 165 by means of a lead 164. The other side of diode 165 is connected to the side of resistor 160 which is opposite to the side connected to the junction point 158.

Assume that the signal applied to the primary 151 of transformer 150 is signal A, which is the signal it is desired to pass. Assume that the signal on the center tap 153 of the secondary 152 is signal B which is the reference signal which has the same frequency as the signal it is desired to pass. The signal applied to the diode 155 will be equivalent to the value of A plus B while the signal applied to the diode 165 will be equivalent to the value of B minus A. As is known to those skilled in the art, the value of the signal at point 158 is equal to 2A if the input signals A and B are of the same frequency and in phase. The value of the signal at point 158 is a minus 2A if the input signals A and B are of the same frequency but out of phase. If the input signals A and B are not of the same frequency the value of the signal at point 158 will be a sinusoidally varying signal at the difference frequency between A and B. By designing RC filter 161 so that it passes a given bandwidth, filtering means 101 can pass the $X_1$ value of the light emanating from light source 10 which is chopped at a given frequency and which is modulated by the two frequencies of chopping means 14 and chopping means 16 which filtering means 105 and 106, respectively, pass. It can be seen that by means of this filtering means each of the desired frequencies which are prevalent in the output of detecting means 96 may be separated from the other frequencies.

The output from filtering means 105 is applied to a gain adjust potentiometer 115, which will be explained later. The output of potentiometer 115, which is $K_1X_1$, is applied to the input of an amplifier 116. The output of filtering means 110 is applied to a potentiometer 117. The operation of this potentiometer will be explained later in conjunction with the operation of potentiometer 115. The output of potentiometer 117, which is $K_1Y_1$, is applied to an input of amplifier 116. The output of filtering means 112, which is $K_1Z_1$, is applied to an input of amplifier 116. Thus, the output of amplifier 116 is the sum of the signals from potentiometer 115, potentiometer 117 and filtering means 112 which is $K_1(X_1+Y_1+Z_1)$.

The output of amplifier 116 is applied to a servomotor or divider 118. The output of divider or servomotor 118 is mechanically connected to the arm of a feedback potentiometer 119. The body of potentiometer 119 is connected between the output of an amplifier 120 and ground, and the center tap, which is mechanically adjusted by servomotor 118, is connected electrically to the input of amplifier 120. Also connected to the input of amplifier 120 is the output of potentiometer 115. By definition $X_1$ divided by $X_1+Y_1+Z_1$ is equal to $x_1$. Thus, since the servomotor 118 adjusts the center tap of the feedback potentiometer 119 in accordance with the input from amplifier 116, which is equal to $K_1(X_1+Y_1+Z_1)$, amplifier 120, which also has an input $K_1X_1$, is acting as a divider and has as its output $x_1$.

The value of $x_1$ is equal to the chromaticity coordinate of the color of the known sample of material. This value of $x_1$ is fed back to an input of an amplifier 130. A second input of amplifier 130 is a known value of $x_1$ that is applied by means of the center tap of a potentiometer 129. The output of amplifier 130, which is the difference between the actual value of $x_1$ and the computed value, is used as an input to potentiometer 115 and adjusts potentiometer 115 to insure that the gain of the overall device is proper by reducing the difference between $x_1$ as computed and $x_1$ as set on potentiometer 129 to a negligibly small value. While this technique will increase the system accuracy if an accurate value of $x_1$ is known its use is not necessary for the performance of this device.

Servomotor 118 is mechanically connected to the center arm of a potentiometer 121 the body of which is electrically connected at one end to the output of an amplifier 122 and at the other end to ground. The center tap is electrically connected to the input of amplifier 122. The output of potentiometer 117 is also applied to the input of amplifier 122. Since the input of servomotor 118 varies the arm of the potentiometer 121 and, thus, the gain of amplifier 122, the value of the output of potentiometer 117 is divided by the value of the output of amplifier 116 in amplifier 122. By definition the output of amplifier 122 is equal to $y_1$ which is the chromaticity coordinate of the known color of the sample 13. Both values $x_1$ and $y_1$ are available as outputs from the device. The output of amplifier 122 is also fed back to the input of an amplifier 123. Also applied to the input of amplifier 123 is a known value of $y_1$ which is obtained from a manual adjustment of a potentiometer 124. The output of amplifier 123 is therefore the difference between the known value of $y_1$ and the computed value of $y_1$ which is applied as an input to potentiometer 117 to readjust the gain of the overall device to reduce the output of amplifier 130 to a negligibly small value indicating that the computed value of $x_1$ is equal to the known value of $x_1$.

The output of potentiometer 115 is applied to an amplifier 131. The output from filtering means 106 is applied to an input of amplifier 131 and also to an input of an amplifier 132. The input to amplifier 131 from filtering means 106 is equal $K_2X_2-K_1X_1$ and the input from potentiometer 115 is equal to $K_1X_1$, therefore, the sum of the two, or the output of amplifier 131, is equal to $K_2X_2$.

The output of filtering means 111 is applied to an amplifier 133 and is an input to amplifier 132. The output of potentiometer 117 is also applied to the input of amplifier 133. The output of filtering means 111 is equal to $K_2Y_2-K_1Y_1$ and the output of potentiometer 117 is equal to $K_1Y_1$ and since the two are added in amplifier 133 the output is equal to $K_2Y_2$.

The output of filtering means 113 is applied as an input to amplifier 132. The output of amplifier 116 serves as a fourth input to amplifier 132 and the sum of the four inputs is equal to the output of amplifier 132 which is $K_2(X_2+Y_2+Z_2)$. The output of amplifier 132 is utilized to drive a servomotor or divider 134. Servomotor 134 is mechanically connected to the arm of a potentiometer 135 the body of which has one end connected to the output of an amplifier 136 and the other end connected to ground. The center tap of potentiometer 135 is electrically connected to the input of amplifier 136. Also connected to the input of amplifier 136 is the output of amplifier 133. Since potentiometer 135 adjusts the gain of amplifier 136 in accordance with the input to servomotor 134, the output of amplifier 133 is divided by the input to divider 134 in amplifier 136 and the output of amplifier 136 is equal to this value. Thus, the output of amplifier 136 is equal to $y_2$ which is the chromaticity coordinate of the unknown color of sample 12.

Servomotor 134 is also mechanically connected to the center tap of a potentiometer 140 the body of which has one end connected to the output of an amplifier 141 and the other end connected to ground. The center tap of 140 is electrically connected to the input of amplifier 141. Also connected to the input of amplifier 141 is the output of amplifier 131. As previously explained, amplifier 141 and servomotor 134 act as a divider and the output of amplifier 131 is divided by the output of amplifier 132 to produce the output from amplifier 141 equivalent to $x_2$ which is one of the chromaticity coordinates of the unknown color of sample 12.

Thus, a device has been disclosed which can define an unknown color in terms of electrical signals, $x_2$ and $y_2$, that may be compared to electrical signals of a known color, $x_1$ and $y_1$, which it is desired to reproduce. Because the device operates on the light to provide signals indicative of two or more of the chromaticity coordinates simultaneously the sample of material 12 having the unknown color may be a continuously changing piece of cloth, a continuously flowing stream of paint, or any other continuously moving element. The electrical signals produced by this device may be utilized to control the amount of dye in the sample being checked; they may be utilized to control the intensity of a light source or they may be used in many other ways to control a desired function which in turn controls the color of the element being analyzed.

While we have shown and described a preferred embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What we claim is:

1. A colorimeter for determining the color of a sample comprising in combination:

optical means to transmit light from said sample;

chopping means to chop separate portions of said light, each portion being chopped at a separate frequency;

means in optical alignment with said chopping means to form an individual spectrum from each of said separate portions of the chopped light;

masking means in optical alignment with said spectrum forming means for transmitting only selected different portions of said individual spectra;

detecting means in optical alignment with said masking means for converting said transmitted portions of said individual spectra to electrical signals, which signals alternate at the frequencies of said chopping means;

electrical filtering means electrically connected to said detecting means for isolating from each other said electrical signals alternating at the frequencies of said chopping means; and computing means electrically connected to said electrical filtering means for converting said signals into electrical outputs varying in magnitude as a function of the color of said sample.

2. A colorimeter for determining the color of a sample comprising in combination:

means to transmit a first light beam from said sample;

means to produce a second reference light beam;

first chopper means in optical alignment with said light transmitting means and said light producing means to chop said first and second light beams at first and second frequencies;

combining means in optical alignment with said first chopper means for combining the chopped beams into a single combined beam;

second chopping means in optical alignment with said combining means to chop separate portions of said combined beam, each portion being chopped at a separate frequency with each separate frequency being different than the frequencies of said first chopping means;

means in optical alignment with said second chopping means to form an individual spectrum from each of said separate portions of the combined light beam;

masking means in optical alignment with said spectrum forming means for transmitting only selected different portions of said individual spectra;

detecting means in optical alignment with said masking means for converting said transmitted portions of said individual spectra to electrical signals;

first electrical filtering means electrically connected to said detecting means for isolating from each other the electrical signals alternating at said separate frequencies of said second chopping means;

second electrical filtering means electrically connected to said first filtering means for isolating from each other the electrical signals alternating at the frequencies of said first chopping means; and computing means electrically connected to said second electrical filtering means for converting said signals into electrical outputs varying in magnitude as a function of the color content of said sample.

References Cited by the Examiner

UNITED STATES PATENTS

| 2,157,389 | 5/1939 | Park | 88—14 |
|---|---|---|---|
| 2,517,554 | 8/1950 | Frommer. | |
| 2,631,489 | 3/1953 | Golay | 250—226 X |
| 2,856,811 | 10/1958 | Kaye | 250—226 |
| 3,023,661 | 3/1962 | McClusky et al. | 88—14 X |
| 3,052,154 | 9/1962 | Bolz | 88—14 |

FOREIGN PATENTS

| 898,409 | 7/1944 | France. |
|---|---|---|
| 495,165 | 6/1954 | Italy. |

JEWELL H. PEDERSEN, *Primary Examiner.*

W. A. SKLAR, T. L. HUDSON, *Assistant Examiners.*